US010798208B2

(12) United States Patent
Singh et al.

(10) Patent No.: US 10,798,208 B2
(45) Date of Patent: Oct. 6, 2020

(54) AVAILABILITY DATA CACHING IN MEETING SYSTEMS

(71) Applicant: MICROSOFT TECHNOLOGY LICENSING, LLC, Redmond, WA (US)

(72) Inventors: Jaskaran Singh, Redmond, WA (US); Hemant Sharma, Seattle, WA (US); Jaya Matthew, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 15/276,625

(22) Filed: Sep. 26, 2016

(65) Prior Publication Data

US 2018/0091620 A1    Mar. 29, 2018

(51) Int. Cl.
*H04L 29/08* (2006.01)
*G06Q 10/10* (2012.01)

(52) U.S. Cl.
CPC ..... *H04L 67/2852* (2013.01); *G06Q 10/1095* (2013.01)

(58) Field of Classification Search
CPC .............. H04L 67/2852; G06Q 10/1095
See application file for complete search history.

(56) References Cited

U.S. PATENT DOCUMENTS

| 8,489,442 B1 | 7/2013 | Mohler |
| 8,712,820 B2 | 4/2014 | Gingras et al. |
| 9,047,592 B2 | 6/2015 | Bocking et al. |
| 2005/0165631 A1 | 7/2005 | Horvitz |
| 2007/0265903 A1 | 11/2007 | Blair et al. |
| 2008/0091499 A1 | 4/2008 | Barber-Mingo et al. |
| 2008/0091500 A1* | 4/2008 | Barber-Mingo ............... G06Q 10/063116 705/7.19 |
| 2009/0112984 A1* | 4/2009 | Anglin ................... G06Q 10/00 709/204 |
| 2009/0132329 A1* | 5/2009 | Lam ................. G06Q 10/06311 705/7.13 |
| 2011/0252351 A1 | 10/2011 | Sikora et al. |
| 2012/0131191 A1 | 5/2012 | May et al. |

(Continued)

OTHER PUBLICATIONS

"Scheduling a Meeting in the Outlook Calendar on Windows", Retrieved From: https://www.cumccolumbia.edu/it/howto/email/schedule.html, Retrieved Date: Sep. 26, 2016, 3 Pages.

(Continued)

*Primary Examiner* — Esther B. Henderson
(74) *Attorney, Agent, or Firm* — Michael Best & Friedrich LLP

(57) ABSTRACT

Availability data caching in, meeting services is provided. In some examples, a list of users whose data is to be cached locally for a user may be determined based on factors such as their relevance to the user, a likelihood of a meeting being requested with the users, a history of common meetings, and similar factors. What type of user data to cache, for how long, at which granularity level, and similar parameters may be determined as well. User data for users from the list may be retrieved on-demand or on a regular basis from server associated with those users and stored at a server or other computing device for the user for fast access when the user requests to schedule a meeting.

19 Claims, 8 Drawing Sheets

(56) References Cited

U.S. PATENT DOCUMENTS

2014/0181992 A1\* 6/2014 Janson .................... G06F 21/60
                                                    726/27
2015/0006221 A1   1/2015 Mermelstein
2017/0316383 A1\* 11/2017 Naganathan ....... G06Q 10/1095

OTHER PUBLICATIONS

"What GroupWise Provides", Retrieved From: http://www.novell.com/documentation/gw8/gw8_install/data/ajbders. html?view=print, Retrieved Date: Sep. 26, 2016, 2 pages.

"You Experience Issues in Outlook When You Try to Configure Free/Busy Information or When You Try to Delegate Information", Retrieved From: https://support.microsoft.com/en-in/kb/958443, Retrieved Date: Sep. 26, 2016, 7 Pages.

\* cited by examiner

AVAILABILITY DATA CACHING IN MEETING SYSTEMS

BACKGROUND

Calendar systems provide a variety of tools that assist users in managing tasks, meetings, and their overall schedules. In a hosted service with a large number of subscribers, or in cross-service scenarios, users are able to check each other's schedules, find suitable meeting times and places. However, in cross-service environments or within services with large numbers of users, obtaining calendar and other information associated with desired attendees may present challenges. Information delivery may be delayed due to latency, communication breakdowns, etc.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to availability data caching in meeting services. In some examples, a list of users to be cached may be determined based on relevancy, likelihood of meeting, and history of meetings with a user. Parameters for data to be cached and a type of data to be cached may also be determined and user data for users from the list may be retrieved and cached locally for the user based on the parameters and type of data. Upon receiving a request to schedule a meeting with one of the users from the list and the user, the cached user data for that user may be provided to a scheduling agent.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
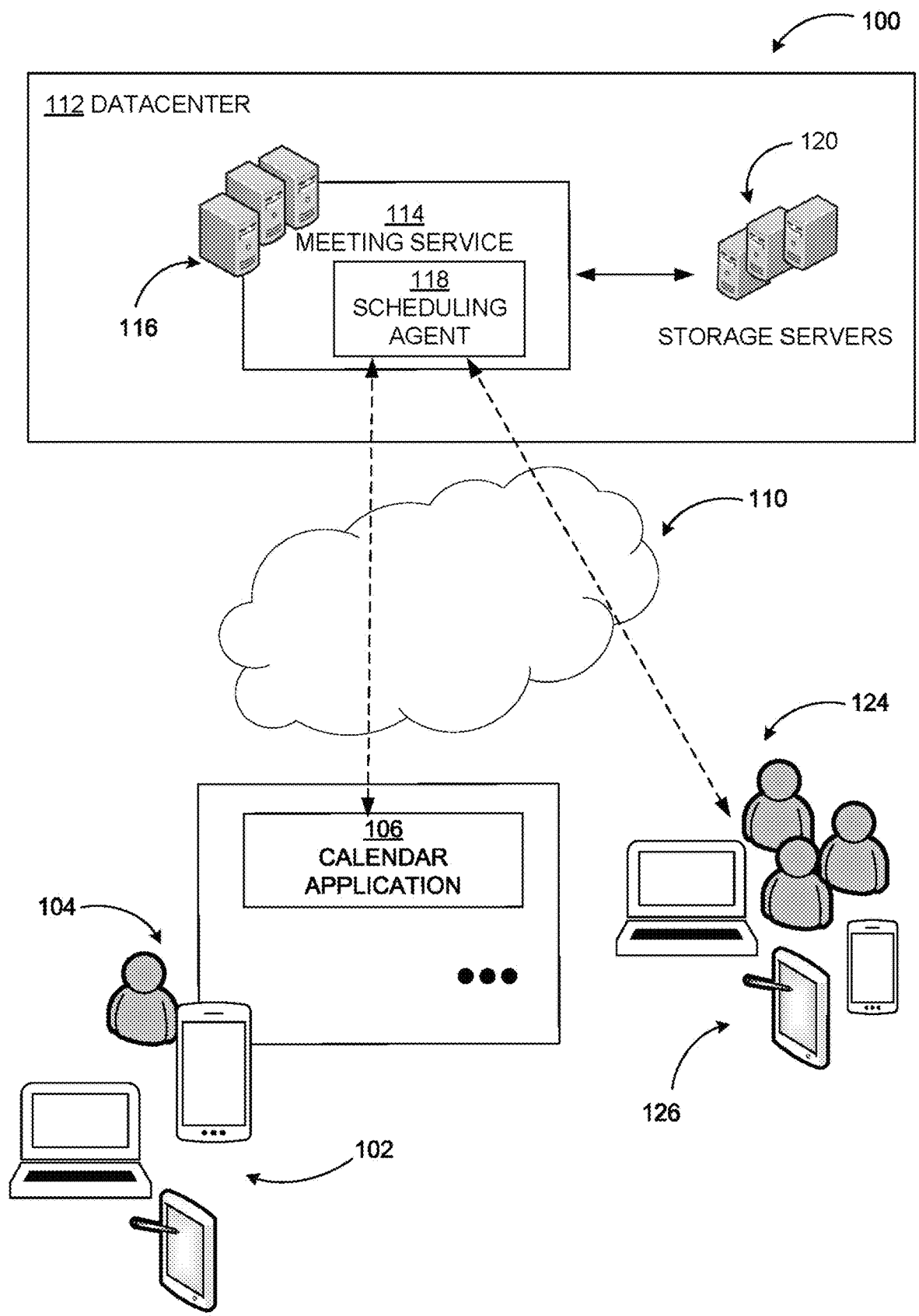
FIG. 1 includes an example network environment where a system to provide availability data caching in meeting services may be implemented.

As briefly described above, embodiments are directed to availability data caching in, meeting services. In some examples, a list of users whose data is to be cached locally for a user may be determined based on factors such as their relevance to the user, a likelihood of a meeting being requested with the users, a history of common meetings, and similar factors. What type of user data to cache, for how long, at which granularity level, and similar parameters may be determined as well. User data for users from the list may be retrieved on-demand or on a regular basis from server associated with those users and stored at a server or other computing device for the user for fast access when the user requests to schedule a meeting.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description, is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium, is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing a meeting service with availability data caching. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where a system to provide availability data caching in meeting, services may be implemented.

As illustrated in diagram 100, an example system may include a datacenter 112 hosting a cloud-based meeting service 114 configured to provide calendar management and, meeting scheduling services that may be accessed across multiple devices and users. The datacenter 112 may include one or more processing servers 116 configured to execute the meeting service 114, among other components. In some embodiments, at least one of the processing servers 116 may be operable to manage the meeting service 114, where data from devices (such as devices 102 and 126) may be stored at storage servers 120 (or associated data stores). As described herein, the meeting service 114 may be implemented as software, hardware, or combinations thereof.

In some embodiments, the meeting service 114 may be configured to interoperate with various applications to provide meeting management and calendar maintenance. For example, as illustrated in the diagram 100, a user 104 may execute a thin (e.g., a web browser) or a thick (e.g., a locally installed client application) version of a calendar application 106 through the device 102 with which the meeting service 114 may be configured to integrate and interoperate with over one or more networks, such as network 110. The calendar application 106 may be an application hosted by the meeting service, such as a calendar client, for example. The device 102 may include a desktop computer, a laptop computer, a tablet computer, a vehicle mount computer, a smart phone, or a wearable computing device, among, other similar devices. A communication interface may facilitate communication between the meeting service 114 and the calendar application 106 over the network 110.

In an example embodiment, the meeting service 114 may include a scheduling agent 118 configured to receive calendar information from individual users and schedule meetings based on user input, automatic optimization methods, and other approaches. The calendar information may also be stored remotely at the meeting service 114 within the storage servers 120, for example. In other examples, calendar information may be stored at individual servers responsible for groups of users. To reduce delays and increase accuracy, a system according, to embodiments may determine a list of users likely to attend a meeting with a user. User data such as calendar information and other data may be received from servers associated with the users from the list and cached at a server associated with the user. That way, when the user requests to schedule a meeting, data may be retrieved directly from the user's local server.

A system according to embodiments allows availability data caching in meeting services. By determining users whose data is to be cached, retrieving and caching locally needed user data for scheduling meetings, increased efficiency, reduced local and cloud computing resource usage, reduced bandwidth usage, and increased security and collaboration may be achieved.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users maintaining calendars and scheduling meetings.

Figure 2:
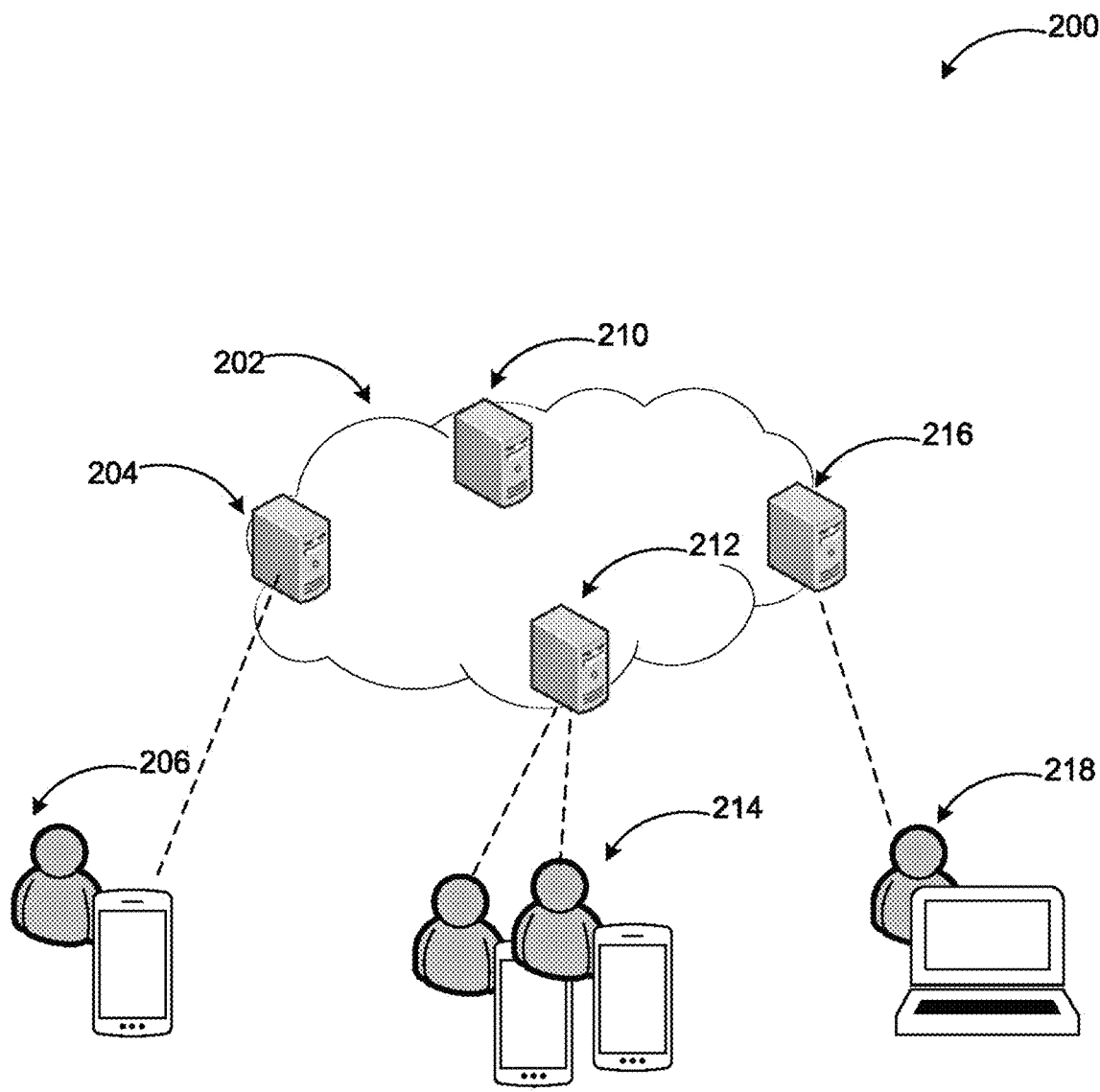
FIG. 2 illustrates conceptually a multi-server service with availability data caching.

FIG. 2 illustrates conceptually a multi-server service with availability data caching.

As shown in a diagram 200, a meeting service (e.g., cloud-based service 202) may include a number of components. For example, management servers (e.g., server 210) may manage operations and configuration of the service, processing servers may process data, special purpose devices may perform specialized tasks such as malware protection, load balancing, etc. In, some examples, a set of distributed servers may be responsible for storing and processing data associated with, groups of users such as server 204 for user 206, server 212 for users 214, and server 216 for user 218. Users may employ a variety of devices to access the meeting service.

In one example implementation, the meeting service may be part of a communication service that provides various modes of communication services such as email, messaging, online conferencing, etc. along with calendar management and scheduling. Thus, the servers 204, 212, and 216 may be mailbox servers that store at least a portion of user data such as communication data, calendar data, and so on.

When a meeting is being scheduled, calls may go out from an organizing user's respective server to other servers to obtain availability information along with other data necessary for the meeting. With a system like the once described above, many components may be in the path of such calls and result in inaccuracies or delays due to latencies or failures.

In a system according to embodiments, an assistance agent within the meeting service may determine and maintain (e.g., update) a list of users likely to attend a meeting with a user and cache calendar and other data associated with those users at the server for the organizing user. Thus, latencies and failure based delays and inaccuracies may be prevented by accessing the needed data for scheduling meetings directly at the organizing user's server (e.g., mailbox server).

Figure 3:
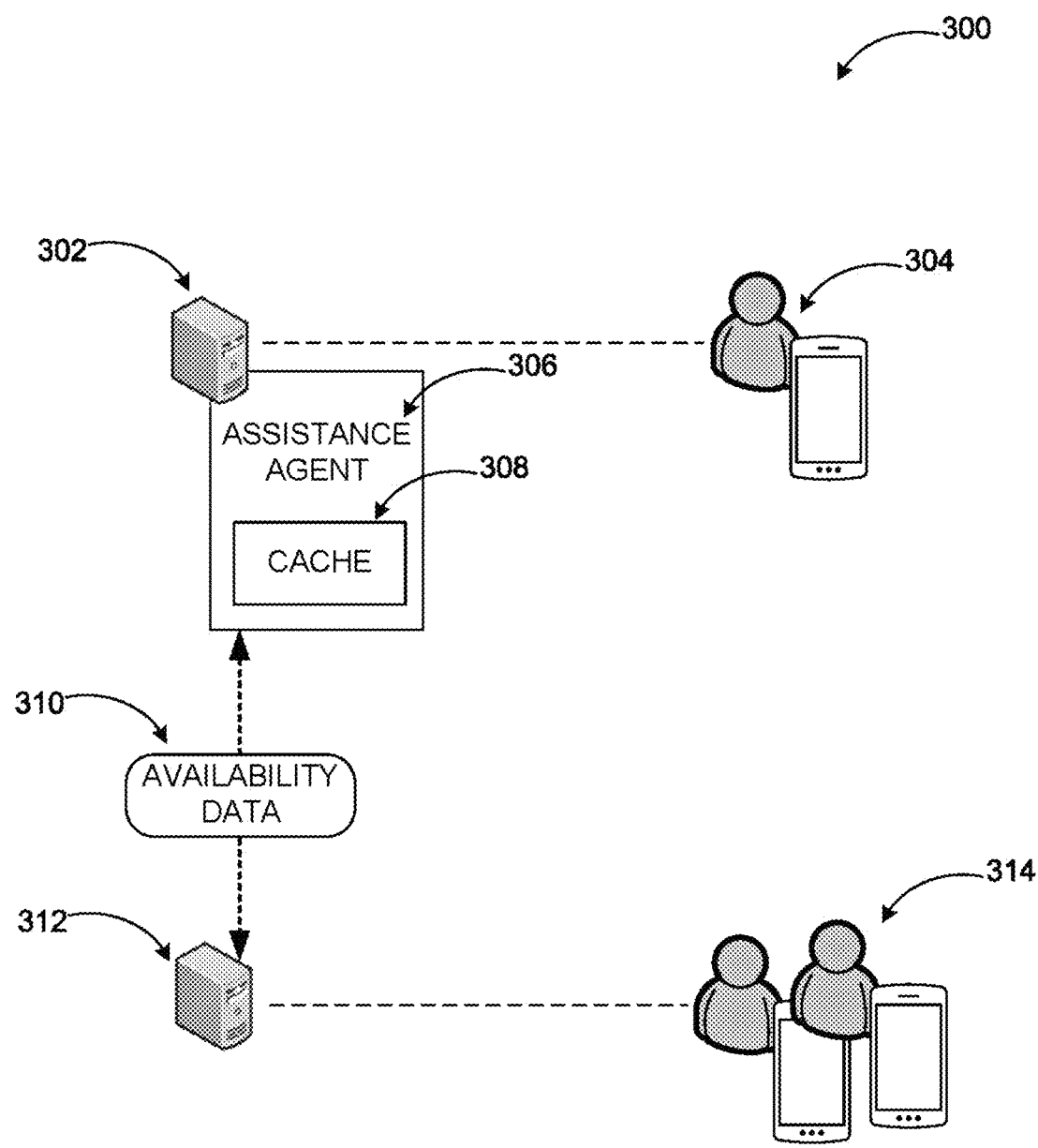
FIG. 3 illustrates an example assistance agent retrieving and caching user data for meeting scheduling.

FIG. 3 illustrates an example assistance agent retrieving and caching user data for meeting scheduling.

As discussed above, a meeting service according to embodiments may include an assistance agent 306 retrieving availability data 310 from one or more servers (e.g., server 312) of users 314 and store in local cache 308 of a server 302 of a user 304 to have direct access to the data for scheduling meetings. Diagram 300 shows an example configuration, where the assistance agent 306 may be responsible for user 304 and be executed at server 302 associated with the user 304. In other examples, the assistance agent may be executed at another server, such as a management server or a processing server of the meeting service and be responsible for caching availability data for a number of users associated with multiple servers at their respective servers. The assistance agent may also manage multiple users' availability data at the same server.

In some embodiments, availability data from on-premise service may be cached as well. Other users data may be filtered or restricted based on permissions set by the other users and/or organization policies. Moreover, the assistance agent may assess the cached data for staleness and request updates or remove stale data. Updates may be batched based on a number and expected data exchange to reduce data traffic.

Figure 4:
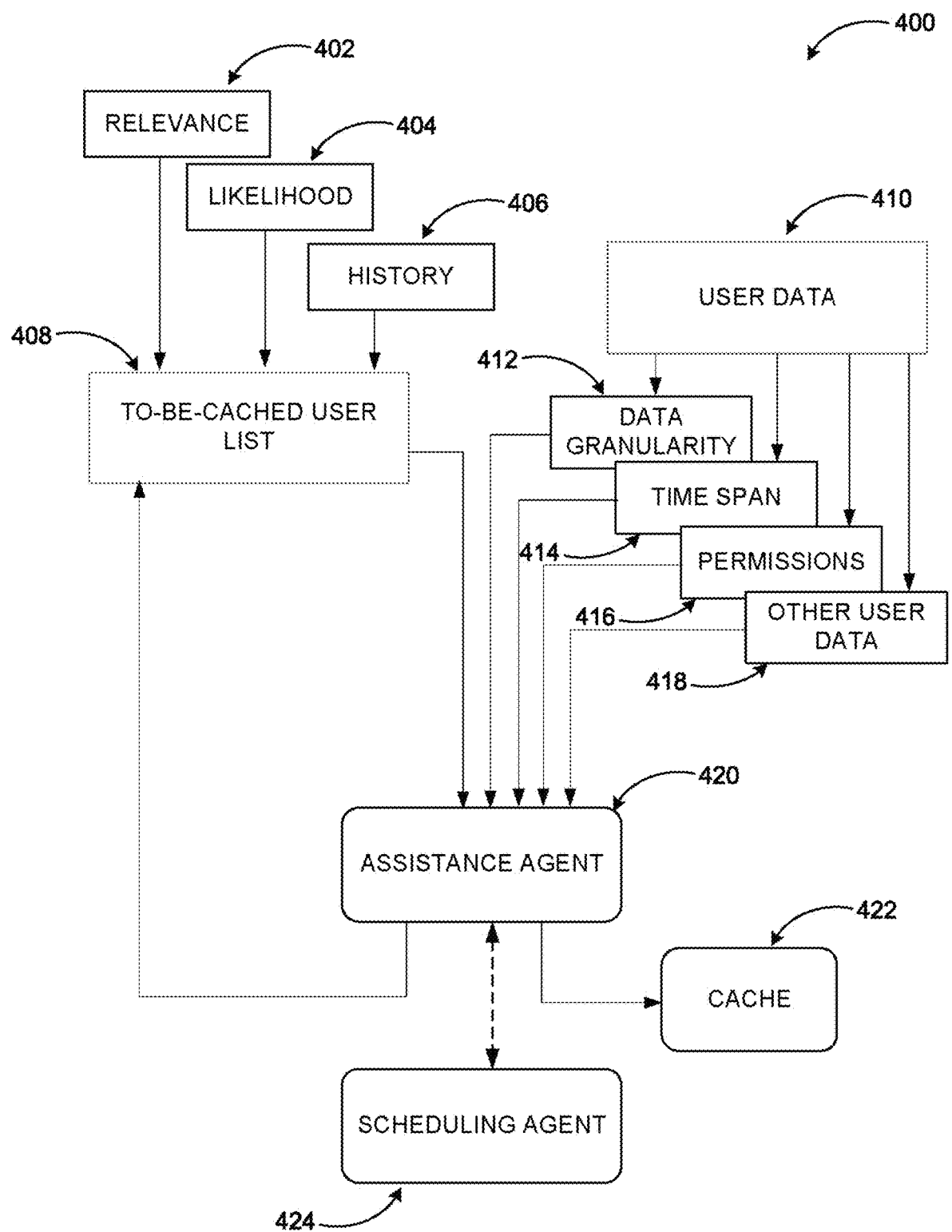
FIG. 4 illustrates an example diagram of availability data caching in meeting services.

FIG. 4 illustrates an example diagram of availability data caching in meeting services.

As shown in diagram 400, a to-be-cached user list 408 may be generated based on one or more approaches such as relevance 402, likelihood of attending a meeting together 404, history of common meetings 406, and others. The list may be generated by the assistance agent 420 or received from another service such as a relevance service, a graph based personalized search service, or other similar resources. In some embodiments, the list may be binary, that is users that are likely to attend a meeting with the organizing user may be on the list, everyone else may be kept out. In other embodiments, the list may be multi-level, that is, users, in the list may be grouped in categories based on their likelihood to attend a meeting with the organizing user. In the latter scenario, a type, an amount, and/or a granularity of the user data to be cached may be selected differently for different categories or groups in the list.

The user data 410 may include availability information, start time, end time, time span, user identifiers (e.g., email address), prolonged absence indication, permission levels, and comparable data. Various filters such a data granularity 412, time span 414, permissions 416, and other data 418 may be applied to the cached data. For example, availability information may include a spectrum ranging from busy or free to detail of a user's busy time (e.g., meeting, attendees, location, etc.). At what level of granularity the availability information is to be made available may be determined based on the permissions assigned by that user or an organization policy.

In some examples, a time span for caching availability data may be determined based on a number of factors including storage availability, network connectivity, a number of meetings scheduled, number of users in the list, amount of user data to be cached, a clean-up schedule, an update schedule, and so on. In other examples, the time span may be customized for individual users or groups of users as opposed to all users in the list.

The assistance agent 420 may store the user data in a cache 422 or similar storage at a server associated with an organizing user. In other embodiments, some or all of the user data may also be stored in local device storage for the organizing, user. When the organizing user initiates a meeting scheduling process, the assistance agent 420 may provide needed availability data to a scheduling agent 424 to schedule the meeting with users from the list. The assistance agent 420 may also provide feedback based on scheduled meetings to a resource generating the list to update the list regularly or on-demand.

Figure 5:
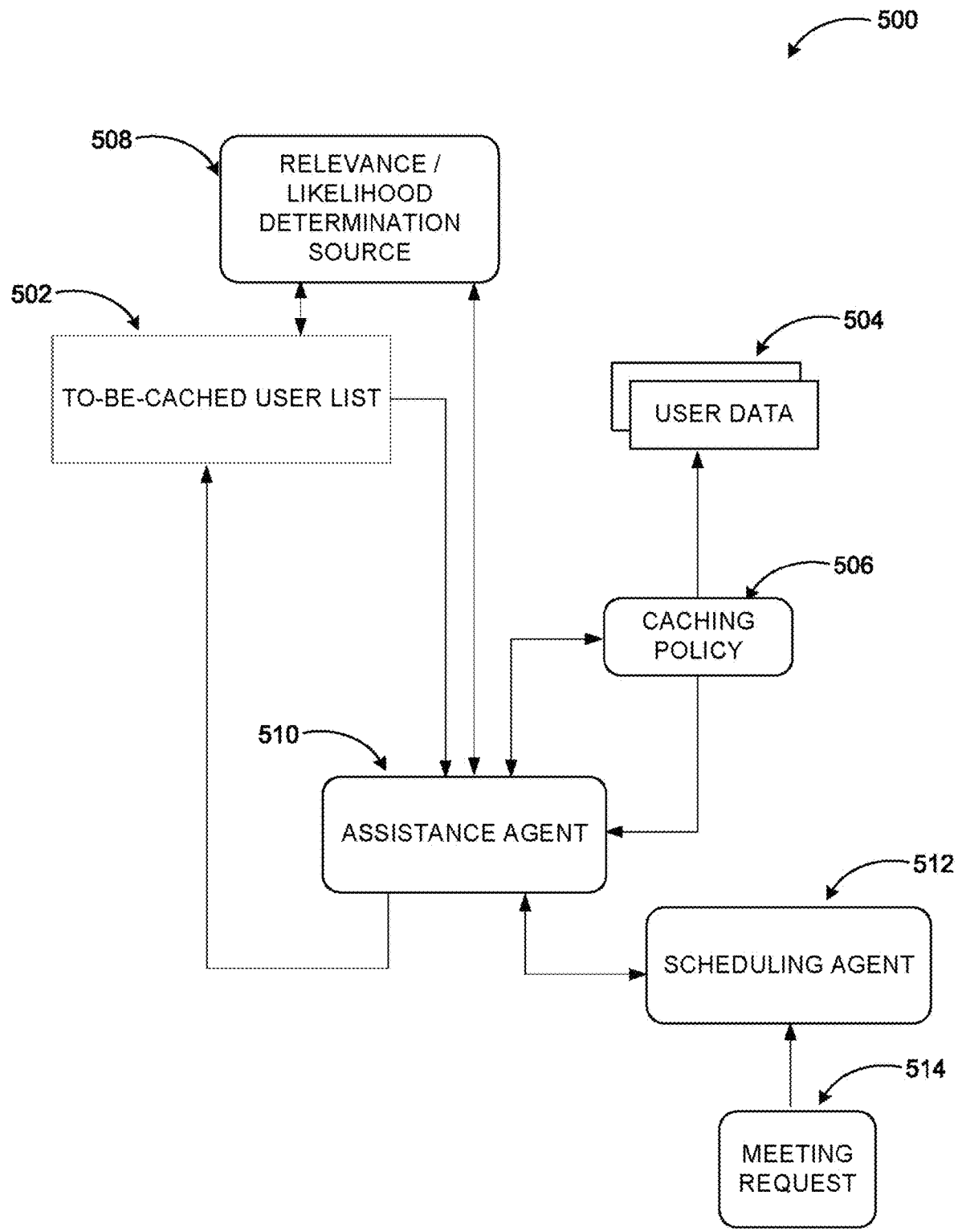
FIG. 5 illustrates example components in providing availability data caching in meeting services.

FIG. 5 illustrates example components in providing availability data caching in meeting services.

As shown in diagram 500, a relevance, likelihood of meeting determination source 508 such as a directory service, a relevance service, a graph based personalized search service, or similar may provide a to-be-cached user list 502 to an assistance agent 510. The assistance agent 510 may use, generate, update one or more, caching policies 506 based on a number of factors including, storage availability, network connectivity, a number of meetings scheduled, number of users in the list, amount of user data to be cached, a clean-up schedule, an update schedule, etc.

The assistance agent 510 may receive/retrieve user data 504 from respective servers of the users in the to-be-cached user list 502 and store in a cache store of a server associated with a user such, that the data can be directly accessed when organizing meetings. A scheduling agent 512 may organize meetings in response a meeting request 514 from the user in some examples and coordinate with the assistance agent 510 retrieval of other user data.

The assistance agent 510 may receive feedback from the scheduling agent 512 on users who are requested for meetings and update the list or provide feedback to the source such that the list is maintained up-to-date. The caching policy 506 may also be updated based on changes to the factors and/or changes to the users in the list.

In some examples, the assistance agent 510 may monitor changes in availability, prolonged absence, and working hours. Upon detecting a change, the assistance agent 510 may create a new item or update an existing item in the cache based on the change(s). The user data including permissions of the potential meeting attendees may be stored in a message format, for example. The assistance agent 510 may also send control flow messages to the potential meeting attendees based on their permission levels. Control flow messages may be automatically send each time there is a change in a user's calendar or potential meeting attendees servers may be queried regularly to retrieve changed information.

The assistance agent 510 may also perform a clean-up of stale user data. The clean-up may be performed when the list changes, when the organizing user stops meeting with someone on the list, or on a regular basis. The assistance agent 510 may also publish the organizing user's data to other assistance agents for use in organizing meetings by other users, standard or custom application programming interfaces (APIs) may be used to exchange information between assistance agents and other components of the meeting service.

The examples provided in FIGS. 1 through 5 are illustrated with specific systems, services, applications, modules, codes, and notifications. Embodiments are not limited to environments according to these examples. Availability data caching in meeting services may be implemented in environments employing fewer or additional systems, services, applications, engines, codes, and user experience configurations. Furthermore, the example systems, services, applications, modules, and notifications shown in FIG. 1 through 5 may be implemented in a similar manner with other values using the principles described herein.

Figure 6:
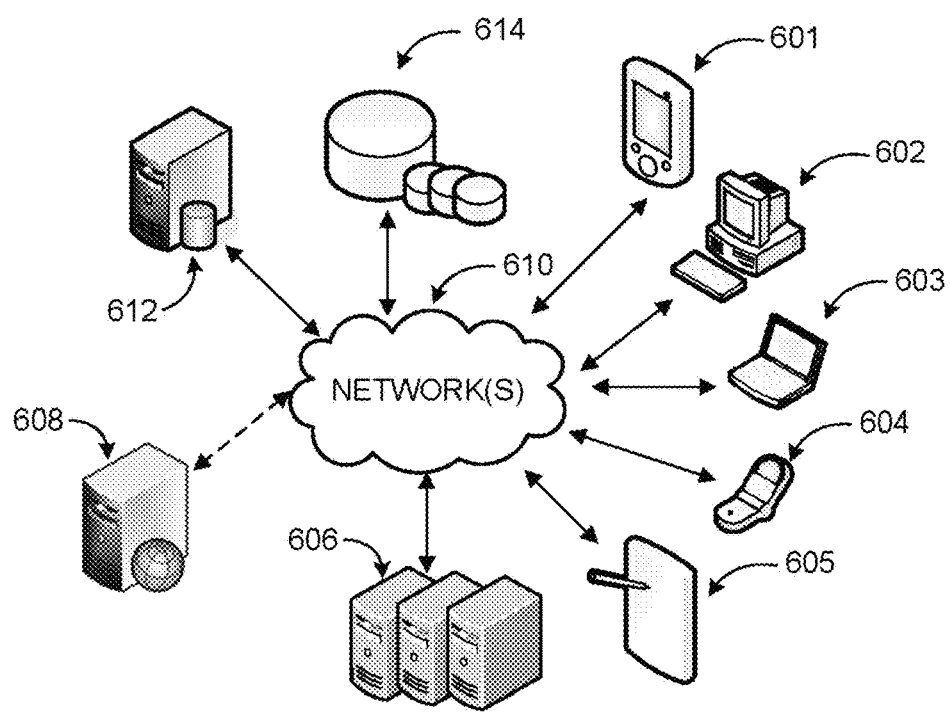
FIG. 6 is a networked environment, where a system according to embodiments may be implemented.

FIG. 6 is, a networked, environment, where a system according to embodiments may be implemented. In addition to locally installed applications (for example, application 106), availability data caching in meeting services may also be employed in conjunction with hosted applications and services (for example, a storage service 114) that may be implemented via software executed over one or more servers 606, individual server 608, or at client devices, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide, a variety of services as discussed above. Relevant data such as meeting data, scheduling model data, and similar may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed for availability data caching in meeting services. Furthermore, the networked environments discussed in FIG. 6 are for illustration purposes only. Embodiments are not limited to the example applications, engines, or processes.

Figure 7:
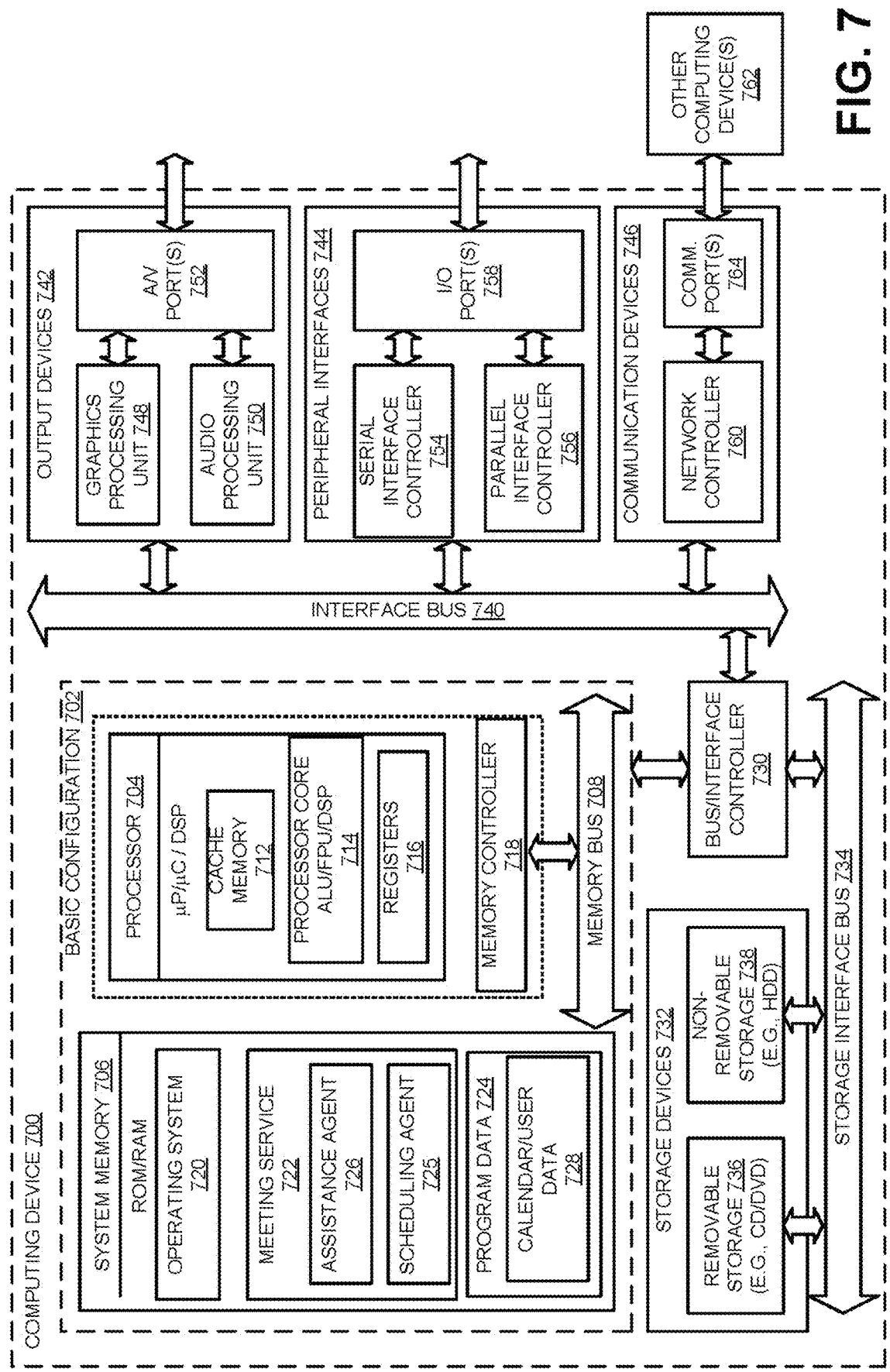
FIG. 7 is a block diagram of an example general purpose computing device, which may be used to provide availability data caching in meeting services.

FIG. 7 is a block diagram of an example general purpose computing device, which may be used to provide availability data caching in meeting services.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating, between the processor 704 and the system memory 706. The basic configuration 702 is illustrated in FIG. 7 by those components within the inner dashed line.

Depending on the desired configuration, the processor 704 may be of any type, including but not limited to a microprocessor (μP), a microcontroller (μC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system, memory 706 may include an operating system 720, a meeting service 722, an assistance agent 726, a scheduling agent 725, and program data 724. The assistance agent 726 may determine' likely users who may attend meetings with a user, retrieve their data, and cache locally to make available to the scheduling agent 725 for scheduling meetings accurately and rapidly. The program data 724 may include, among other data, calendar and/or user data 728, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid, state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output, devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not, limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing, device 700 may also be implemented as a personal computer including both laptop computer and non-laptop computer configurations.

Example embodiments may also include methods to provide availability data caching in meeting services. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
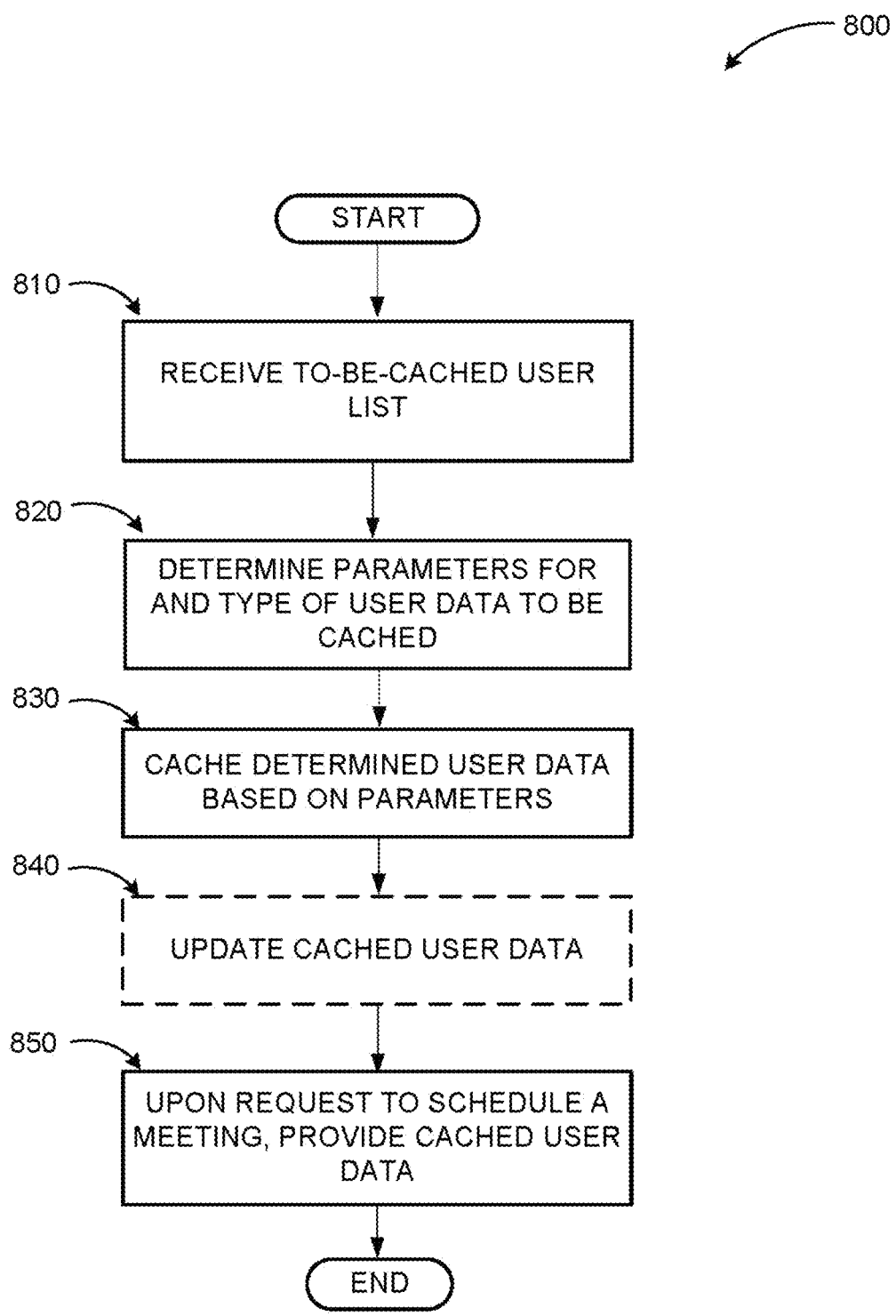
FIG. 8 illustrates a logic flow diagram of a method to provide availability data caching in meeting services.

FIG. 8 illustrates a logic flow diagram of a method to provide availability data caching in meeting services.

Process 800 may be implemented on a computing device, server, or other system. An example system may include a computer communicatively coupled to a cloud server hosting a meeting service.

Process 800 begins with operation 810, where a list of users whose data is to be cached may be received. A relevancy service, a graph-based personalized search service, or comparable sources may be used to determine a list of users who are likely to meet with a user based on behavior patterns, history of meetings, and other factors. At operation 820, parameters and type of data to be cached may be determined such as a time span over which to store data, granularity of availability data (free/busy, types of busy periods, full details, and so on).

At operation 930, the determined types of data for users from the list, may be retrieved on-demand or on a regular basis from servers associated with those users and cached at a server for the user. The data may be received based on querying the servers or subscribing to regular publications of those servers. Similarly, the cached data may be updated based on changes to user data of the users on the list at optional operation 840. At operation 850, the cached data may be provided to a scheduling agent in response to a request for scheduling a meeting with one or more of the users on the list.

The operations included in process 800 are for illustration purposes. Availability data caching in meeting services may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing availability data caching in meeting services is described. The means may include a means for receiving a list of users likely to attend a meeting with a user; a means for determining one or more parameters associated with, user data for users in the list, where the one or more parameters include a type of user data; a means for receiving the user data for the users in the list from one or more servers and storing the received user data at a server associated with the user; and a means for providing the user data stored at the server associated with the user to a scheduling agent in response to receiving a meeting request.

According to some examples, a method to provide availability data caching in meeting services is described. The method may include receiving a list of users likely to attend a meeting with a user; determining one or more parameters associated with user data for users in the list, where the one or more parameters include a type of user data; receiving the user data for the users in the list from one or more servers and storing the received user data at a server associated with the user; and in response to receiving a meeting request, providing the user data stored at the server associated with the user to a scheduling agent.

According to other examples, receiving the list of users likely to attend the meeting with the user may include receiving the list from one or more of a directory service, a relevance service, and a graph based personalized search service. The one or more parameters may further include a detail level of the availability data, a time span to cache the user data, a user identification, a prolonged absence period, and working hours. The method may also include providing feedback to a service that generates the list to enable updating of the list based on changes to, a meeting behavior of the user.

According to further examples, the method may further include storing the received user data at the server associated with the user according to a caching policy. The method may also include setting the caching policy based on one or more of storage availability at the server associated with the user, a network connectivity, a number of meetings scheduled, a number of users in the list, an amount of user data to be cached, a clean-up schedule, and an update schedule. The method may further include updating the caching policy based on one or more of a change to the list, a change to one or more of the parameters, and a change in a meeting behavior of the user. The method may also include determining a level of details of the availability data to be stored based on a permission level for each user on the list. The level of details of the availability data may include a free-busy indication, a busy status type, a content of a meeting, attendees of a meeting, and a location of a meeting.

According to other examples, a computing device to provide availability data caching in meeting services is described. The computing device may include a communication interface configured to facilitate communication between the computing device and one or more servers; a memory configured to store instructions; and one or more processors coupled to the memory, where the one or more processors, in conjunction with the instructions stored in the memory, are configured to execute components of a meeting service. The components of the meeting service may include a scheduling agent configured to schedule meetings for a user and an assistance agent. The assistance agent may be configured to receive a list of users likely to attend a meeting with a user; determine a type of user data to store, a detail level of the user data to store, and a time span to store the user data; retrieve the user data for the users in the list from one or more servers based on the determination; store the retrieved user data at a cache store of the computing device; and in response to receiving a meeting request, provide the stored user data to the scheduling agent.

The assistance agent may be further configured to select a time span to store the user data based on one or more of storage availability at the server associated with the user, a network connectivity, a number of meetings scheduled, a number of users in the list, an amount of user data to be cached, a clean-up schedule, and an update schedule. The assistance agent may be further configured to clean up stored user data based on one or more of a change in available storage space, an update to the list, and a predefined period. The assistance agent may also be configured to subscribe to one or more servers associated with users in the list; and receive updates to the user data from the one or more servers. The list may be a multi-level list comprising two or more categories based on a likelihood of the users in the list to attend a meeting with the user.

According to further examples, a system to provide availability data caching in meeting services is described. The system may include one or more servers configured to execute and manage a meeting service; one or more servers configured to manage user data for groups of users; and a plurality of assistance agents for managing caching of the availability data at a local server for each user. Each of the plurality of assistance agents may be configured to generate a list of users likely to attend a meeting with a user; determine a type of user data to store, a detail level of the user data to store, and a time span to store the user data; retrieve the user data for the users in the list from the one or more servers based on the determination; store the retrieved user data at a cache store of the local server for the user; and in response to receiving a meeting request, provide the stored user data to the meeting service.

According to some examples, the assistance agents may be configured to exchange corresponding user data for users associated with each assistance agent, manage caching of the availability data for a user, or manage caching of the availability data for a group of users. Each assistance agent may also be configured to determine a meeting behavior of a corresponding user and adjust one or more of a caching policy, an update schedule, and a clean-up schedule based on the determined meeting behavior. Each assistance agent may be further configured to set one or more of a caching policy, an update schedule, and a clean-up schedule based on an organization policy.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide availability data caching in meeting services, the method comprising:
 prior to receiving a meeting request from a user,
  identifying, with a processor, a list of users likely to attend a meeting with the user, the list of users including a subset of users associated with the meeting services;
  retrieving, with the processor, availability data for each of the users in the list from one or more servers; and
  storing, with the processor, a copy of the retrieved availability data at a cache on a server associated with the user based on a caching policy, wherein the caching policy is set according to a number of meetings scheduled; and
 in response to receiving a meeting request specifying a participant from the user,
  providing, with the processor in response to the participant being included in the list of users, the availability data of the participant stored at the cache on the server associated with the user to a scheduling agent for scheduling a meeting based on the meeting request; and
  submitting a call, with the processor in response to the participant not being included in the list of users, to a server associated with the participant for the availability data of the participant and providing the availability data of the participant to the scheduling agent for scheduling the meeting based on the meeting request after receiving a response to the call.

2. The method of claim 1, wherein identifying the list of users likely to attend the meeting with the user comprises: receiving the list from one or more of a directory service, a relevance service, and a graph based personalized search service.

3. The method of claim 1, further comprising:
 providing feedback to a service that generates the list to enable updating of the list based on changes to a meeting behavior of the user.

4. The method of claim 1, further comprising:
 storing the retrieved availability data at the cache associated with the user according to a caching policy.

5. The method of claim 4, further comprising:
 setting the caching policy based on one or more of storage availability at the server associated with the user, a network connectivity, a number of meetings scheduled, a number of users in the list, an amount of availability data to be cached, a clean-up schedule, and an update schedule.

6. The method of claim 4, further comprising:
 updating the caching policy based on one or more of a change to the list and a change in a meeting behavior of the user.

7. The method of claim 1, further comprising:
 determining a level of details of the availability data to be stored in the cache based on a permission level for each user on the list.

8. The method of claim 7, wherein the level of details of the availability data include a free-busy indication, a busy status type, a content of a meeting, attendees of a meeting, and a location of a meeting.

9. A computing device to provide availability data caching in meeting services, the computing device comprising:
 a communication interface configured to facilitate communication between the computing device and one or more servers;
 a memory configured to store instructions; and
 one or more processors coupled to the memory, wherein the one or more processors, in conjunction with the instructions stored in the memory, are configured to execute components of a meeting service, the components of the meeting service comprising:
  a scheduling agent configured to schedule meetings for a user; and
  an assistance agent configured to:
   prior to receiving a meeting request from the user,
    identify a list of users likely to attend a meeting with the user, the list of users including a subset of users associated with the meeting services;
    determine a type of availability data to store for the list of users, a detail level of the availability data to store, and a time span to store the availability data;
    retrieve availability data for each of the users in the list from one or more servers based on the determination; and
    store a copy of the retrieved availability data at a cache store of the computing device based on a caching policy, wherein the caching policy is set according to a number of meetings scheduled; and
   in response to receiving a meeting request specifying a participant from the user,
    provide, in response to the participant being included in the list of users, the availability data of the participant stored at the cache store of the computing device to the scheduling agent for scheduling a meeting based on the meeting request; and submit a call, in response to the participant not being included in the list of users, to a storage location associated with the participant for the availability data of the participant and providing the availability data of the participant to the scheduling agent for scheduling the meeting based on the meeting request after receiving a response to the call.

10. The computing device of claim 9, wherein the assistance agent is further configured to select the time span to store the availability data based on one or more of storage availability, a network connectivity, a number of meetings scheduled, a number of users in the list, an amount of availability data to be cached, a clean-up schedule, and an update schedule.

11. The computing device of claim 9, wherein the assistance agent is further configured to clean up stored availability data on the computing device based on one or more of a change in available storage space, an update to the list, and a predefined period.

12. The computing device of claim 9, wherein the assistance agent is further configured to:
subscribe to one or more servers associated with users in the list; and
receive updates to the availability data from the one or more servers.

13. The computing device of claim 9, wherein the list is a multi-level list comprising two or more categories based on a likelihood of the users in the list to attend a meeting with the user.

14. A system to provide availability data caching in meeting services, the system comprising:
one or more servers, including one or more processors and a memory, configured to execute and manage a meeting service;
one or more servers, including one or more processors and a memory, configured to manage availability data for groups of users; and
a plurality of assistance agents for managing caching of availability data at a local server for each user, each of the plurality of assistance agents configured to:
prior to receiving a meeting request from a user,
identify a list of users likely to attend a meeting with the user, the list of users including a subset of users associated with the meeting services;
determine a type of availability data to store for the list of users, a detail level of the availability data to store, and a time span to store the availability data;
retrieve the availability data for each of the users in the list from the one or more servers based on the determination; and
store a copy of the retrieved availability data at a cache on a server associated with the user based on a caching policy, wherein the caching policy is set according to a number of meetings scheduled; and
in response to receiving a meeting request specifying a participant from the user,
provide, in response to the participant being included in the list of users, the availability data of the participant stored at the cache on the server associated with the user to the meeting service;
submit a call, in response to the participant not being included in the list of users, to a storage location associated with the participant for the availability data of the participant and provide the availability data of the participant to the meeting service for scheduling the meeting based on the meeting request after receiving a response to the call.

15. The system of claim 14, wherein the assistance agents are further configured to exchange corresponding availability data for users associated with each assistance agent.

16. The system of claim 14, wherein each assistance agent is configured to manage caching of the availability data for a user.

17. The system of claim 14, wherein each assistance agent is configured to manage caching of the availability data for a group of users.

18. The system of claim 14, wherein each assistance agent is configured to:
determine a meeting behavior of a corresponding user; and
adjust one or more of a caching policy, an update schedule, and a clean-up schedule based on the determined meeting behavior.

19. The system of claim 14, wherein each assistance agent is configured to set one or more of a caching policy, an update schedule, and a clean-up schedule based on an organization policy.

\* \* \* \* \*